US006920236B2

(12) United States Patent
Prokoski

(10) Patent No.: US 6,920,236 B2
(45) Date of Patent: Jul. 19, 2005

(54) DUAL BAND BIOMETRIC IDENTIFICATION SYSTEM

(75) Inventor: Francine J. Prokoski, Fairfax, VA (US)

(73) Assignee: Mikos, Ltd., Fairfax, VA (US)

( * ) Notice: Subject to any disclaimer, the term of this patent is extended or adjusted under 35 U.S.C. 154(b) by 641 days.

(21) Appl. No.: 10/105,406

(22) Filed: Mar. 26, 2002

(65) Prior Publication Data

US 2002/0136435 A1 Sep. 26, 2002

Related U.S. Application Data

(60) Provisional application No. 60/278,860, filed on Mar. 26, 2001.

(51) Int. Cl.$^7$ ................................................. G06K 9/00
(52) U.S. Cl. .............................. 382/115; 356/71; 902/3
(58) Field of Search ................................. 382/115–127; 356/71; 340/5.52, 5.53, 5.8–5.83; 902/3, 5

(56) References Cited

U.S. PATENT DOCUMENTS 5,488,674 A * 1/1996 Burt et al. .................. 382/284
5,497,430 A * 3/1996 Sadovnik et al. ........... 382/156

OTHER PUBLICATIONS

"Visible–light and Infrared Face Recognition" by Chen et al. Proc. of Workshop on Multimodal User Authentication, pp. 48–55, 2003.*
"Fusion of Visual and Thermal Signatures with Eyeglass Removal for Robust Face Recognition" by Heo et al. Computer Vision and Pattern Recognition Workshop, 2004 Conference on, Jun. 2–27, 2004. pp.: 122–122.*
"Appearance–Based Facial Recognition Using Visible and Thermal Imagery: A Comparative Study" by Selinger et al. Technical Report, Equinox corporation, Feb 2001. pp. 1–28.*

* cited by examiner

Primary Examiner—Jon Chang
Assistant Examiner—Charles Kim
(74) Attorney, Agent, or Firm—Whitman, Curtis & Christofferson, PC

(57) ABSTRACT

A biometric identification system directed toward use of dual-band visual-infrared imaging with appropriate techniques for integrating the analysis of both images to distinguish less reliable from more reliable image components, so as to generate a composite image comprised of layers. Correlation and analysis of the composite layers enables improved reliability in identification. The method and apparatus of the invention provide for efficient and optimized use of dual-band imaging for biometric identification of faces, fingerprints, palm and hand prints, sweat pore patterns, wrist veins, and other anatomical features of humans and animals.

One embodiment includes the addition of a thermal infrared camera to a visual facial recognition system, with the IR image used to determine that the subject is alive and locate any features which are disguised. Another embodiment adds a visual camera to a thermal infrared facial recognition system, with areas of the visual image used to add colors and to fill-in behind eyeglasses which block the thermal infrared signature.

20 Claims, 16 Drawing Sheets

41

42

00:41:50:00   15:01:59
              1993-11-02

DUAL BAND BIOMETRIC IDENTIFICATION SYSTEM

This application claims the benefit of Provisional Application No. 60/278,860, filed Mar. 26, 2001.

BACKGROUND OF THE INVENTION

1. Field of the Invention

The present invention generally relates to systems for using biometric measurements for identification, and more particularly to use of imaging techniques for such identification.

2. Background Description

Visual biometric recognition systems have inherent accuracy limitations. The quality of the visual image is strongly affected by ambient lighting conditions and resulting artifacts such as glare, shadows, dimness, and loss of detail. In total darkness, no image is obtained. In dim light or when an IR flash illuminator is used, the image resulting may be flat and devoid of most details. Under any lighting condition, especially in dim light, visual face recognition is less accurate for dark skinned persons, resulting in a racial bias to systems which use only visual images for face identification. Under any lighting conditions, visual face imagery often can not discriminate between identical twins, detect the use of surgical or worn disguises, or distinguish a live person from a photograph or mannequin. When used in automated surveillance systems, visual imagery makes it difficult and computationally intense to locate and separate faces within a frame of imagery. When a surveillance or other system is to be activated based upon the detected presence of any person, generally another sensor such as proximity or motion alarm must be used due to the time required to determine human presence based upon detecting faces in visual imagery. When gait, or other body movements are to be recognized, use of visual imagery alone makes the tasks of isolating a person's image, segmenting his body parts, and tracking movements very difficult in complex backgrounds. Visual ID of fingerprints may not insure that the finger is present and that the subject is alive at the time of identification. Visual images of actual iris patterns may be confused by patterns imprinted on contact lenses.

Automated face recognition systems based upon visual imaging often use the manually or automatically designated location of the eyes to position, scale, rotate, and de-skew the image. When the person is wearing sunglasses, various approximations can be made as to where the eye are believed to be located. However, errors in those approximations produce significant errors in identification against large databases. Additional features extracted from visual imagery for use in recognition or identification often include metrics involving the relative distances between facial features which can be seen in the image. There are on the order of 14 such features which may be seen, including: inner and outer eye corners, nostrils, bow of the lips, edges of the nose base, outer edges of the mouth, head outline, eyebrows. Also, there are other features which are more subjectively located such as the highest point of cheekbones. In dim light, especially for dark-skinned persons or when sunglasses are worn, few of these features may be apparent. In addition, use of makeup or other disguises, or changes in facial expression may distort the position of the features and result in recognition errors. In the case of visual recognition systems, then, analysis of face metrics is recommended only for classification and not for positive identification except in cases of very small databases.

Infrared recognition systems also have inherent limitations. IR provides no color information, meaning that eye, skin, hair, clothing, and vehicle colors are not detected. While this makes IR ID not racially biased, and less vulnerable to being fooled by those attributes which can easily be disguised, the lack of color information is a serious limitation when it is necessary to provide information to a human response force which is to locate or apprehend a person based upon imagery collected. A second limitation to IR imaging is the fact that thermal infrared emissions do not penetrate many glasses and plastics. Therefore, it is often not possible to image a person through a vehicle window or building window, or to see his eye area behind eyeglasses. The effect of eyeglasses on a thermal infrared image is akin to the effect of sunglasses on a visual image. Thermal infrared images are essentially immune from variations due to lighting changes. Certain disguise methods, such as colorizing agents for skin, hair, or eyes, do not change the IR image. Other disguise methods such as altering eyebrows or the apparent size and shape of the mouth or the definition of cheekbones through use of cosmetics also do not change the IR image. Disguises which involve appliances inside the mouth may distort the IR image more than naturally-performed facial expression and speech-related changes, but do not introduce additional IR features. Other disguises which involve appliques to the skin surface (such as moles, scars, artificial facial hair, and nose prostheses) can block or partially block the IR emissions; they are readily apparent in the IR image due to anomalous spectral histograms of the local area of application.

Under any lighting condition, including total darkness, IR recognition is equally accurate for light and dark skinned persons, resulting in no racial bias to systems which use only IR images for identification. IR imagery can discriminate between identical twins, detect the use of surgical or worn disguises, and distinguish a live person from a photograph or mannequin. When used in automated surveillance systems, IR imagery makes it easy and computationally simple to locate and separate faces within a frame of imagery. When a surveillance or other system is to be activated based upon the detected presence of any person, the use of IR camera makes it fast and accurate to determine human presence based upon detecting faces in imagery. When gait, or other body movements are to be recognized, use of IR imagery makes the tasks of isolating a person's image, segmenting his body parts, and tracking movements very simple even in complex backgrounds.

Automated face recognition systems based upon thermal infrared imaging often use the manually or automatically designated location of the eyes to scale, rotate, and de-skew the image. When the person is wearing eyeglasses, various approximations can be made as to where the eye are believed to be located. However, errors in those approximations produce significant errors in identification against large databases. Additional features extracted from thermal infrared imagery for use in recognition or identification often include metrics involving the relative distances between facial features which can be seen in the thermal infrared image. There include features which may also be seen in visual images, such as: inner and outer eye corners, nostrils, bow of the lips, edges of the nose base, outer edges of the mouth, head outline, eyebrows. However, IR features also include anatomically specific elements such as the paths of blood vessels under the skin, branch points or apparent end points of blood vessels, localized hot spots associated with cuts, tumors, infection, lymph nodes, localized cold spots associated with moles, scars, broken noses. In any light, even for dark-skinned persons, on the order of 300 such features may be apparent. Due to the large number of IR features, there is sufficient data to perform reliable identification or recognition based upon IR feature metrics, if a sufficient portion of the face is available in the image, and if a suitable model is used to account for facial expression, fatigue and stress, and speech-related changes. Even better accuracy may be obtained by using IR image metrics for classification of an image, and then pattern recognition based on thermal contours or blood vessel patterns or minutiae matching for the final identification decision, especially in cases of very large databases.

When face recognition is used in cooperative thermal infrared identification systems, the system accuracy is improved and the computational complexity of the system is reduced if the subject's face is repositioned the same as during the enrollment process. This can be accomplished by having the subject stand in the same place relative to the camera, with the same body and head tilt and the same facial expression. Since persons generally cannot remember and repeat a pose to the extent desired, the system can provide feedback to the subject by displaying the enrolled image overlaid with the current image. The system can furthermore cue the subject by visual or audio clues to: stand closer or straighten your head. Subjects can learn to adjust their face position to get sufficient alignment. Since viewing their own visual facial image is more natural than viewing their IR image, the feedback images, both for the enrolled and current images, are shown using the visual images. The enrolled image is shown with reduced contrast and perhaps only a skeletonized version of the image including the head and major feature outlines. The current image is shown in greater detail, perhaps like a reversed mirror, overlaid on the enrolled image. This feedback use may be the only use of the visual camera in a cooperative system, or in addition the visual camera may be used for locating eyes behind glasses, providing color information, or other uses as described, as well as in additional uses implied by this document.

Covert identification of persons is often an important element of securing high risk targets. Surveilled persons are less likely to adopt measures to avoid identification (such as disguise and staying out of the camera's field of view) if the area has low or no apparent illumination. Many current visual surveillance systems employ infrared illuminators and visual cameras which are sensitive to "near infrared", which is the spectral band just beyond visual, considered from 0.7 to 1.3 micron. A typical visual image using an IR illuminator is shown in 93 of FIG. 9. While the location of the eyes can be readily determined, many of the details seen in the visual image taken under daylight conditions of 91 are lost. However, when compared to a visual image taken under dim light conditions of 92, the IR illuminated image shown in 93 offers significantly more useful details for identification, although the color information is sacrificed. A thermal infrared image of the same person, as shown in 94, which would be the same in daylight or complete darkness, provides anatomical details missing from the other three images. While a simple disguise, manikin, or photograph would fool the visual systems producing images shown in 91, 92, and 93, the image of 94 produced by the thermal infrared imager demonstrates that a live person was present at the time the image was produced, and contains sufficient subsurface anatomical details to uniquely identify a particular person from a collection of people who all look, or are disguised to look, similar to the eye and therefore to the visual camera.

Comparing a thermal infrared image to a visual image can be done most directly when the eyes can be seen in both bands. The eyes can then be used for registration, alignment and scaling. If the subject is wearing glasses, other features must be used which may have greater variation between corresponding points seen in the two images. For example, the nose may produce shadows in the visual image which cause imprecision in designation of the outer corners of the nose tip, which may be precisely located in the thermal infrared image. Use of an integrated dual-band imager, which automatically aligns the thermal infrared and visual images, simplifies the implementation of the methods of this invention, but is not required.

3. Comparison to Prior Art

Numerous approaches to recognition using visual imaging of faces Have been considered. Most commonly they involve collections of face metrics from measurements of the relative distances between visual features such as the nostrils, sides of the nose, corners of the eyes, corners of the mouth, ends of the eyebrows, etc.

U.S. Pat. No. 4,975,969 to Tal discloses a method and apparatus for uniquely identifying individuals by measurement of particular physical characteristics viewable by the naked eye or by imaging in the visible spectrum. This reference defined facial parameters which are the distances between identifiable parameters on the human face, and/or ratios of the facial parameters, and teaches that they can be used to identify an individual since the set of parameters for each individual is unique.

Tal's approach utilizes visible features on the face, and therefore cannot be relied upon to distinguish between faces having similar visual features, for example as would be the case with identical twins. In addition, the "rubber sheeting" effect caused by changes in facial expression, the aging effects which cause lengthening of the nose, thinning of the lips, wrinkles, and deepening of the creases on the sides of the nose, all cause changes in the parameters and ratios of any particular person's face may be measured by anyone taking a photograph, and thereby used to select or disguise another person to appear to be that person. Therefore, the security provided by such a technique may not be adequate for unattended or highly sensitive locations.

Visible metrics in general typically require ground truth distance measurements unless they rely strictly upon ratios of measurements. Thus, such systems can be fooled by intentional disguises, and they are subject to variations caused by facial expressions, makeup, sunburns, shadows and similar unintentional disguises. Detecting the wearing of disguises and distinguishing between identical twins may be done from visible imagery if sufficient resolution and controlled lighting is available. However, that significantly increases the computational complexity of the identification task, and makes the recognition accuracy vulnerable to unintentional normal variations.

The second most common approach to face recognition utilizes a principal components analysis (eigenanalysis) of visual face images to develop a set of characteristic features for matching an unknown visual image against a database of known visual images. Faces are then described in terms of weighting on those features. The approach claims to accommodate head position changes and the wearing of glasses, as well as changes in facial expression. However, preprocessing for registration is essential to eigenvector recognition systems. The processing required to establish the eigenvector set may be extensive for large databases. Addition of new faces to the database requires the re-training of the system. Turk and Pentland's U.S. Pat. Nos. 5,164,992 and RE36,041 apply the eigenface approach to audience recognition. They reference U.S. Pat. No. 4,858,000 of Daozehng Lu, who uses infrared detectors to locate members of the viewing audience, who are then imaged with visual cameras.

The two primary face recognition methods of metrics and eigenfaces have been commercialized by Visionics and Visage, as well as many other companies worldwide. In every case, the systems use visual imagery, sometimes with the use of infrared detectors to locate faces in cluttered scenes, and sometimes with the use of infrared illuminators to allow the face to be seen under dim conditions. Accuracies vary between 55% and 90% depending on lighting conditions, the time between enrollment and subsequent identification, and other variables including skin color of the subject. Prokoski has issued patents relating to the use of both approaches to thermal infrared images. Neither matching method has yet been commercially applied to the use of thermal infrared imagery Biometric identification systems which use passively collected images from infrared cameras operating in the 2–15 micron spectral band are not yet available. The cost of those cameras, and the inability of infrared imagers to see through eyeglasses have been the major hindrances to commercialization of infrared identification. The current invention is aimed at removing those hindrances.

Eigenanalysis of thermal infrared images for identification is described in the Prokoski et al U.S. Pat. No. 5,163,094 which discloses defining "elemental shapes" in the surface thermal image produced by the underlying vascular structure of blood vessels beneath the skin. Depending on the environment of use, thermal facial identification may provide greater security over identification from visual images and may therefore be considered preferable. It is extremely difficult, if not impossible, to counterfeit or forge one face to look like another in infrared, whereas it is often possible to disguise one person to look like another in visible light. However, the use of elemental shapes is found in practice to be vulnerable to such variables as head rotation and tilt, ambient and physiological temperature changes, variations in imaging and processing systems, and distortions or obstructions in a facial image (e.g., due to eyeglasses).

In spite of those limitations, eigenanalysis of the elemental shapes of a thermal facial image has successfully been used for recognition. In a 1993 project for Hanscom Air Force Base, referenced in U.S. Pat. No. 6,173,068 several sets of elemental shapes were produced for each infrared facial image by imposing different thermal banding constraints. The totality of shapes are then analyzed with respect to a library of facial thermal images. Eigenshape analysis is used to compare the characteristics of shapes in each person's images. Eleven characteristics of each shape are considered, including: perimeter, area, centroid x and y locations, minimum and maximum chord length through the centroid, standard deviation of that length, minimum and maximum chord length between perimeter points, standard deviation of that length, and area/perimeter. Each person's image is then characterized by a set of 11-coefficient vectors. The difference in eigenspace between any two images is calculated to yield a measurement to which a threshold was applied to make a "match/no match" decision. Accuracy of 92% or better was achieved in non-cooperative faces-in-the-crowd applications.

Other issued and pending patents of Prokoski address the use of thermal infrared images for face and body part identification through analysis of thermal contours, thermal minutiae, and patterns of vascular segments. U.S. Pat. No. 6,173,068 extracts minutiae from passive thermal infrared images and uses the collection of minutiae similarly to the use of fingerprint minutiae for identification; in this case of the subject's face. Also taught in a pending patent of the inventor, thermal infrared images taken in surveillance applications can be correlated against visual images in a Watch List database to identify persons for whom only a visual reference image is available.

SUMMARY OF THE INVENTION

It is therefore an object of the present invention to improve the accuracy of identification through an integrated analysis of visual and infrared images of the same subject.

Another object of the invention is to create a composite image from visual and infrared images usable to increase the likelihood of identifying the subject in a variety of circumstances, including finding matches in a database of images and also finding the subject in a crowd of people.

Biometric identification systems which rely on visual imaging or on thermal infrared imaging alone have limitations which can be eliminated through directed use of dual-band visual-infrared imaging with appropriate correlation and analysis methods. The method and apparatus of this invention provides a system for efficient and optimized use of dual-band imaging for biometric identification of faces, fingerprints, palm and hand prints, sweat pore patterns, wrist veins, and other anatomical features of humans and animals.

The method of the invention comprises the steps of combining a first band imager and a second band imager into a dual-band system; generating from the dual-band system corresponding images of a specified body area of a subject, the corresponding images being a first band image and a second band image of the same specified body area of the same subject at the same time. Anatomical characteristics of the specified body area are taken into account in determining for which portions of the first band image are degraded, and these portions are encoded in an encoded image. Then a composite image is created comprising separate layers for at least the first band image, the second band image, and the encoded image. Finally, the composite image is used to identify the subject, for example by creating a visual likeness which is circulated to observers in a crowd recently frequented by the subject, or by processing the composite image against a database of existing images.

One embodiment includes the addition of a thermal infrared camera to a visual facial recognition system, with the IR image used to determine that the subject is alive and locate any features which are disguised. Another embodiment adds a visual camera to a thermal infrared facial recognition system, with areas of the visual image used to add colors and to fill-in behind eyeglasses which block the thermal infrared signature. Those and other embodiments use dual-band composite images to optimize the performance of identification systems.

This invention specifically uses thermal infrared and visual images from a dual-band imaging system to improve the utility and accuracy of the resulting facial identification system. It is not necessary that the IR and visual images be pixel-to-pixel registered, or that they have the same array size and orientation, or that the collections be precisely simultaneous. Coincident features can be used to sufficiently align the images to take advantage of the benefits provided.

The combination of the two imaging modalities is systematically performed, based on the underlying limitations and advantages of each mode. The automated system incorporates a logical flow of tests of image quality and content to best utilize the dual mode imagery to maximize the accuracy of the system for a particular application.

Although sensor fusion techniques are in general a well-known method for improving pattern recognition system performance, the method of this invention utilizes a segmented analysis of the IR and visual images based upon anatomical features of human subjects coupled with known limitations of the IR and visual imaging systems, with automatic adjustments to specific scenarios of use, and specific behaviors of the human subjects. In particular, the system uses visual imagery to provide colors and specific localized information missing from the thermal infrared image due to the wearing of eyeglasses or portions of the image being in saturation due to such causes as the non-optimal setting of gain, contrast, and focus on the thermal infrared camera. The system uses thermal infrared imagery to provide specific localized information missing from the visual image due to darkness, glare, skin color, smoke or fog, and non-optimal setting of gain, contrast, and focus on the visual camera. Each mode also detects the use of intentional or accidental disguises which would impair recognition via the other modality.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
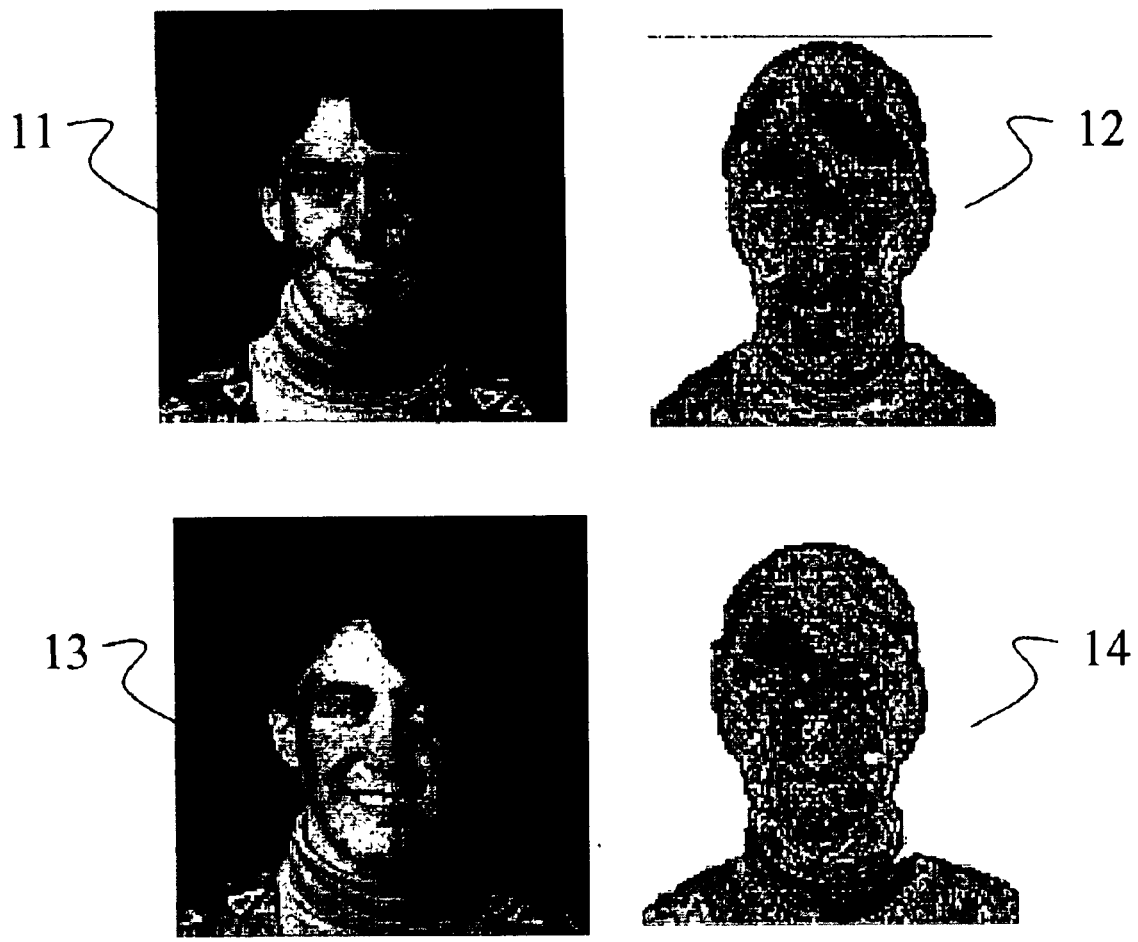
FIG. 1 presents visual and thermal infrared images of identical twins.

The present invention may be described in relation to the following aspects of biometric identification:

1. Biometric systems which utilize face, fingerprint, palm, wrist, or other images are generally prone to unacceptably high false negative rates when the decision threshold is set for acceptable false positive errors. Imaging artifacts are often responsible for both types of errors. When the imaging is done in the visible spectrum, illumination variations such as dim light, glare, and shadows are a primary problem. When the imaging is done in thermal infrared, image saturation and poor depth of focus are primary problems, along with eyeglasses when faces or eyes are to be located and tracked.

2. By reducing the effects of artifacts, a dual-band visual/infrared imaging system offers improvement in accuracy for biometric systems which use anatomical feature location, shape, and interconnections for identification.

3. Localized areas of thermal infrared or visual images which exhibit artifacts such as glare or shadow, focus or motion blur, or saturation may be excised from the image to avoid influencing correlation analysis. The excised areas may be replaced with random noise or other "fill" pixels as needed to maintain the validity of the correlation methods used, or may be replaced with corresponding extracted areas from the other sensor modality.

4. In the case where the body part to be identified is not obstructed, and where imaging conditions and settings are optimal, the thermal infrared image and visual image will display a set of coincident features (such as nostrils, pupils of the eye, mouth, etc. in the case of the face; ridges, minutiae, and sweat pores in the case of fingers and palms). In addition, the thermal infrared image will generally display additional features not seen in the visual image (such as position, size, and shape of blood vessels, lymph nodes, scars, infection sites, etc. in the face; ridges, minutiae, and sweat pores in fingers and palms of persons who do not provide useful visual prints from contact or scanning systems). The coincident features are used to align the two images. Since providing additional unique features for each person, the use of the additional thermal infrared features provides a capability to uniquely identify a larger number of people, and provides discrimination to distinguish between identical twins who cannot be distinguished by visual images.

5. Depending on the correlation technique used, accuracy may be improved by (1) using each modality to weight the utility of each pixel in the other modality's image, then separately performing identification on each of the spectral images (taking account of the weightings), and then combining the identification results, or by (2) compositing the two images and weightings into one image and then performing identification on the composite image.

6. In general, the thermal infrared image will include all the features of the visual image with the exception of colors and areas blocked by eyeglasses, plus additional anatomical details not seen in the visual image. Therefore, identification will be expected to be improved by using a composite (thermal infrared+visual) image rather than just using a visual image.

7. Using a composite (thermal infrared+visual) image will provide improved identification accuracy over using just the thermal infrared image when eyeglasses are worn or when skin color or eye color or hair color are important discriminators. Applying the colors of the visual image onto the thermal infrared image has the potential to distort the thermal infrared feature metrics if the visual image contains cosmetic disguise. For example, coloring lips outside their actual boundaries, or painting-on eyebrows in other than their actual position and shape will corrupt the thermal infrared image, since those makeup artifacts are invisible in the infrared. Therefore, feature boundaries should be determined from the thermal infrared image, not the visual image, in order to eliminate cosmetic disguises.

8. The composite can in general be considered a layered image in which the infrared and visual images each comprise a layer. Another layer indicates areas where the sensors were in saturation or out of focus, or where the image was blocked. Another layer is the vascular branching anatomical structural information extracted from the thermal infrared image. Another layer includes the locations of facial features seen in the visual image. Another layer contains the colors and other cosmetic details from the current visual image, including artificial hair and sunburn. A separate layer outlines areas where real hair is present: cranial, bangs, sideburns, eyebrows, eyelashes, mustache, beard; and includes other characteristics seen in the infrared or visual images such as: length, density, thickness, and color.

9. When a thermal infrared image contains eyeglasses, filling that area with the corresponding portion of the visual image will provide certain missing feature points which may be important to the identification method used, and is not expected to produce any false positive matches. If identification techniques such as the Hidden Markov Method are used, replacing entire horizontal or vertical swaths of the IR image with corresponding swaths of the visual image will result in better ID accuracy than would replacing only features within the swath. In particular, replacing the eye swath in the IR image with the visual image eye swath is advised for HMM facial recognition of persons wearing glasses, and may in general be used for all persons whether or not they are wearing glasses. Application of HMM techniques to face recognition has been used by many investigators, including Stefan Eickeler and Stefan Muller of Gerhard-Mercator-University Duisburg. No previous use of HMM with composite dual-band images has been reported.

10. Enrollment should routinely include taking imagery in both visual and thermal infrared modalities, even if only one mode of identification is planned. That assures the validity of the collected imagery, detects attempts at forgery or disguise, and provides additional characteristics for classification and identification and so supports obtaining a higher accuracy level in identification against larger databases. Although thermal infrared cameras are currently significantly more expensive than visual cameras, and are prohibitively expensive for many biometric identification applications, their prices are expected to decrease sharply over the next few years. Meanwhile, the performance offered by dual-band identification, in terms of accuracy and throughput, will increasingly be cost effective for high security applications.

The relative utility of visual and thermal infrared imagers, and the enhanced utility of composite images formed according to the methods of this invention and used with the apparatus of this invention is best illustrated by the figures, to which we now turn.

FIG. 1 presents visual (11, 13) and thermal infrared (12, 14) images of identical twins (one twin 11, 12 and the second twin 13, 14). Although identical to the eye and in visual images, the thermal infrared images of the twins show distinct differences in the thermal contour shapes.

Figure 2:
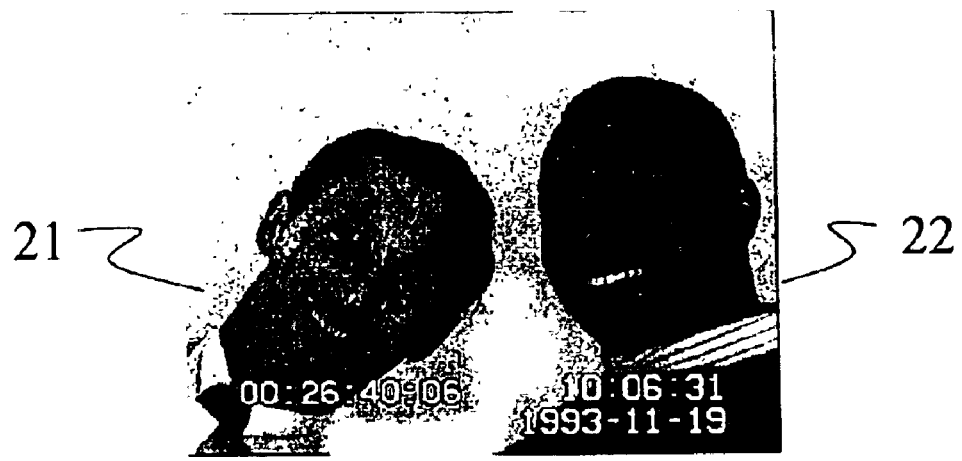
FIG. 2 presents visual and thermal infrared images of a light skinned and a dark skinned persons in dim light.
Figure 2:
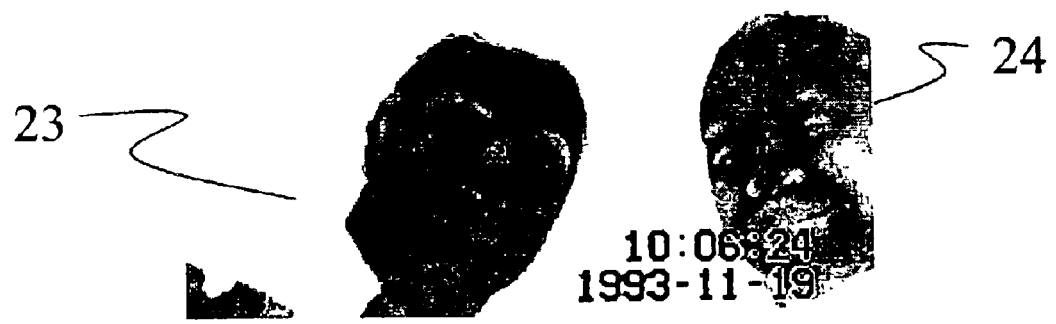

FIG. 2 presents visual (21, 22) and thermal infrared (23, 24) images of a light skinned (21, 23) and a dark skinned (22, 24) persons in dim light. Less detail can be seen in the visual image of the dark skinned person compared to the light skinned person. However, the thermal infrared images provide equal detail for both persons.

Figure 3:
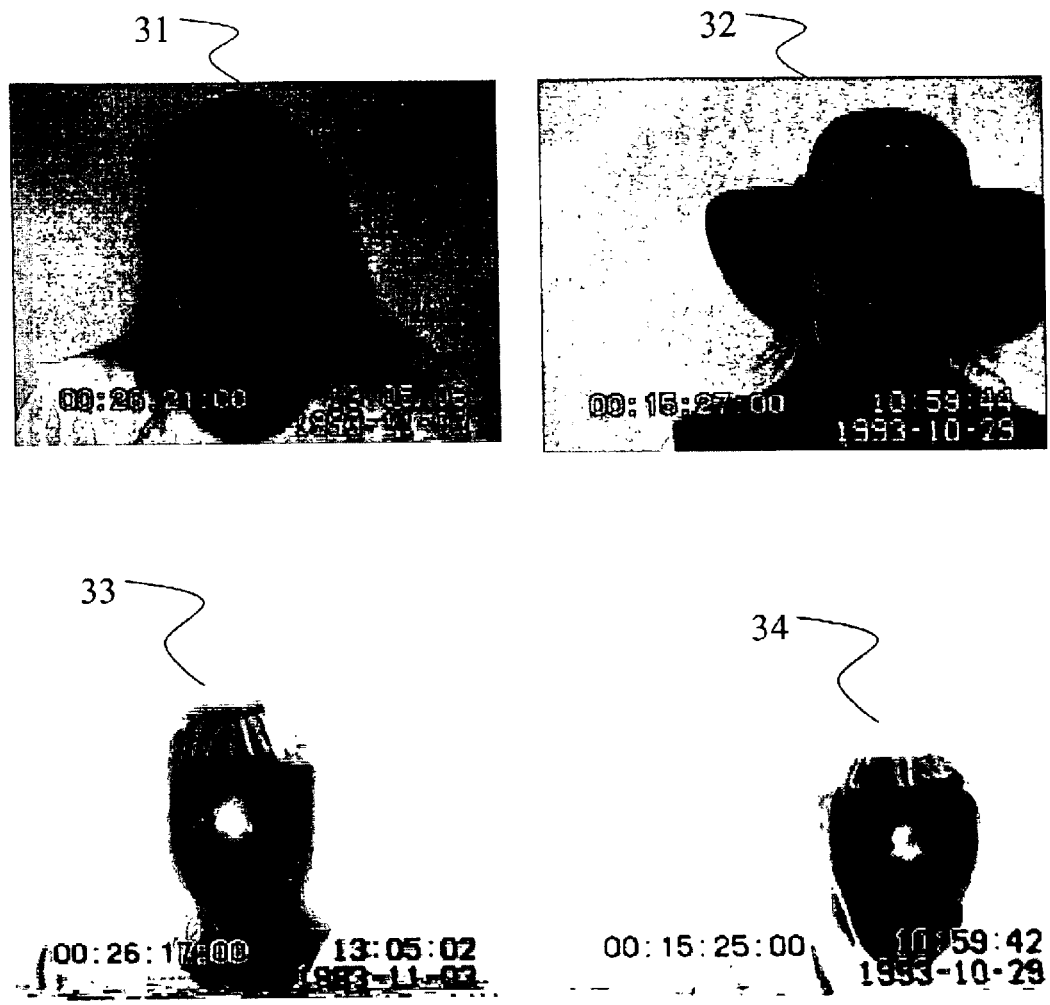
FIG. 3 presents visual and thermal infrared images of a female with and without cosmetic disguises.

FIG. 3 presents visual (31, 32) and thermal infrared (33, 34) images of a female without (31, 33) and wearing (32, 34) cosmetic disguise consisting of painted-on mustache and eyebrows, and change of facial expression including mouth and eye positions. Measurements and locations of eyebrows, eye corners, mouth corners, and connections between those locations would be different for the two visual images. The cosmetic disguises do not appear in the infrared images. Other features, including a near-vertical hot (black) scar at the outer edge of the subject's left eye can be seen in both infrared images but is cosmetically concealed in the visual image.

Figure 4:
FIG. 4 presents visual and infrared images of a face with a localized scar on the right side.
Figure 4:
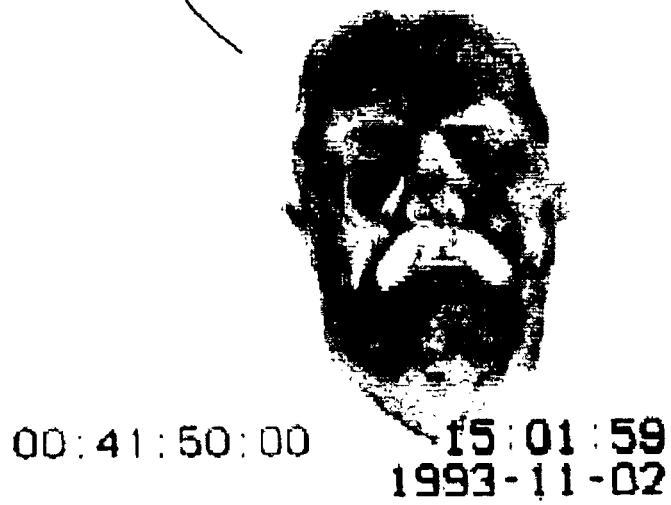

FIG. 4 presents visual (41) and infrared (42) images of a face with a localized scar on the right side. Although the scar can be seen in this visual image, under poorer lighting conditions it is not seen. The corresponding infrared image indicates the scar area as cold (white) relative to the surrounding area, and this scar detection occurs regardless of lighting conditions since the thermal infrared image is independent of general illumination.

Figure 5:
FIG. 5 presents thermal infrared frontal and two profile views of the same person.

FIG. 5 presents thermal infrared frontal (52) and two profile views (51, 53) of the same person. In the right profile (53), he wears glasses. If the eyeglasses are not of the wrap-around design, the profile image is preferred over the frontal image for identification of eyeglass wearers. These images also indicate the thermal appearance of a fake mustache and eyebrows and actual beard. Although it may not be possible to distinguish authentic and fake facial hair when it is very thick, when the hair is short or thin or both, as the beard here, individual hairs and hair follicles may be distinguished if the image has sufficient spatial resolution.

Figure 6A:
FIGS. 6A, 6B, 6C and 6D present four images of the same person to illustrate the variations in feature definition from different image bands.
Figure 6B:
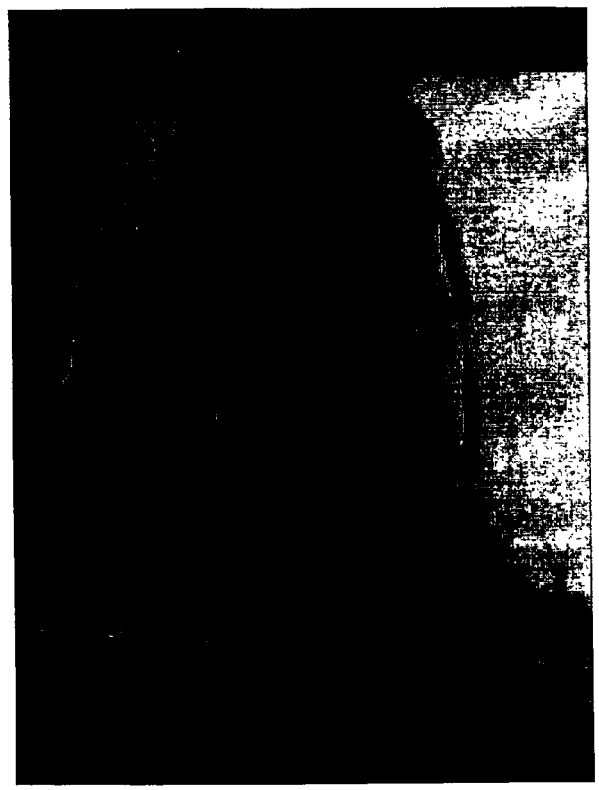
Figure 6C:
Figure 6D:
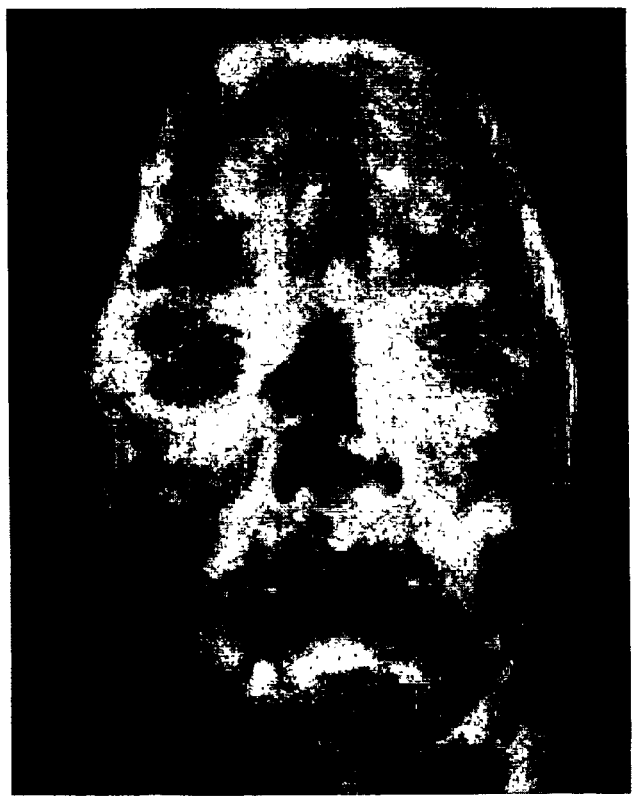

FIGS. 6A, 6B, 6C and 6D present four images of the same person to illustrate the variations in feature definition from different image bands. FIGS. 6A and 6B are from a visual camera. FIG. 6A is in bright light and FIG. 6B is in dim light with shadow. In bright light, features such as eye corners, nostrils, mouth edges, chin crease, eyebrows, and face outline, as well as the colors of eyes, skin, hair, and clothes and the size of the pupils can be determined. Under dim light and shadow, feature positions cannot be precisely denoted, but colors can still observed for the hair and skin. FIGS. 6C and 6D are taken under very dim light. FIG. 6C is from a black and white camera using an infrared illumination source which causes the closest area of the nose and surrounding face to appear very bright. Details such as the scar above the right eye, and creases on the sides of the nose, seen in FIGS. 6A and 6B cannot be seen in FIG. 6C due to the glare caused by the IR illuminator. However, the location of eye corners, nostrils, mouth edges, eyebrows, and face outline are more sharply defined than in the non-illuminated image FIG. 6B. FIG. 6D is a thermal infrared image which provides anatomical details of the vascular structure beneath the skin plus the feature details seen in image FIG. 6C, plus the creases on the sides of the nose and in the chin as seen in FIG. 6A and, to a lesser degree, in FIG. 6B. In this example, the thermal infrared image FIG. 6D includes all the characterizing details of the visual image FIG. 6A except for colors and depiction of the forehead scar, and adds extensive anatomical details of the facial structure under the skin.

Figure 7:
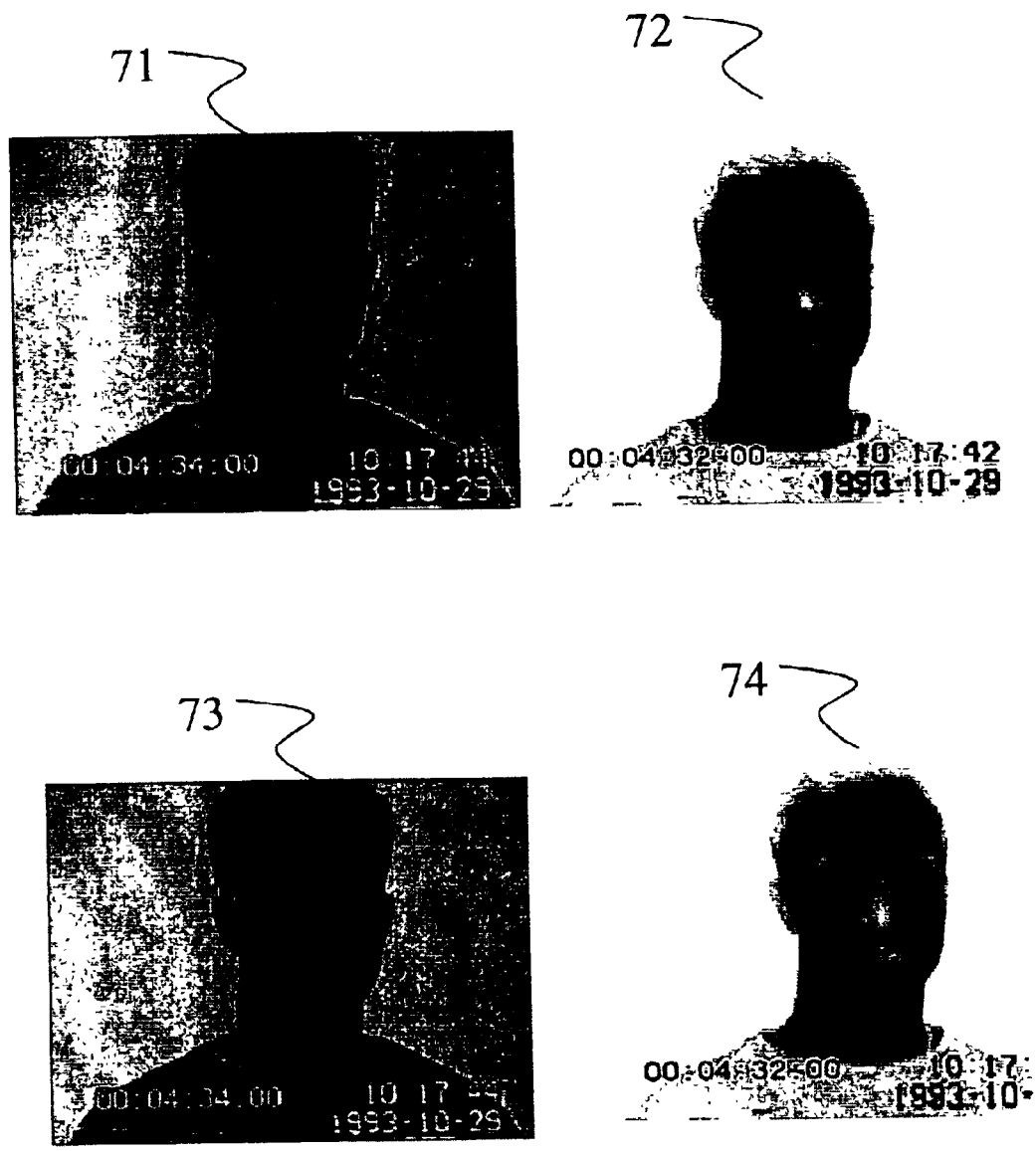
FIG. 7 illustrates integration of analysis of visual and thermal infrared images of the same person to apply a chin line from a visual image to an infrared image.

FIG. 7 illustrates visual (71, 73) and thermal infrared (72, 74) images of the same person. The chin line is distinct in the visual image (71) due to the illumination conditions which create a shadow below the chin. In the infrared image (72), the demarcation between chin and neck is not distinct. This is often the case with open neck shirts, and is a source of error in determining head size. The chin edge is demarcated in the visual image (73) and then transferred to the corresponding thermal infrared image (74).

Figure 8:
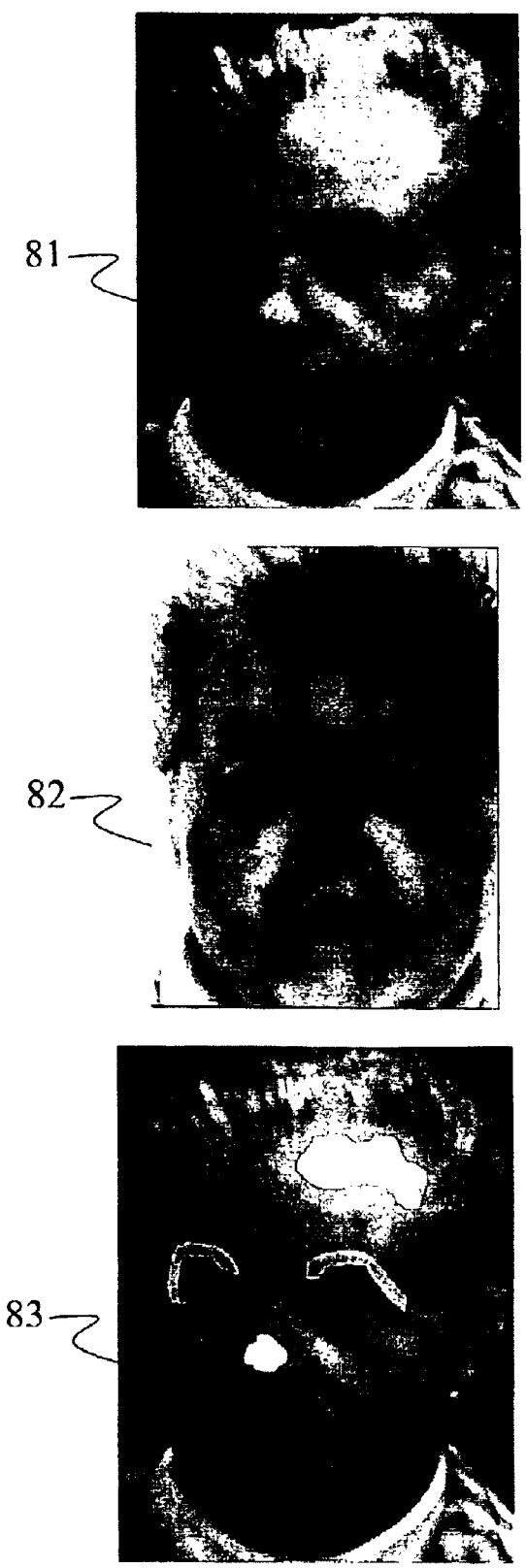
FIG. 8 illustrates the use of thermal infrared images to determine the presence of cosmetics and lighting artifacts in visual images.

FIG. 8 illustrates the use of thermal infrared to determine the use of cosmetics and/or lighting artifacts as seen in visual images. The apparent bright areas on the forehead and nose tip in 81 have no corresponding feature in the thermal infrared image 82. Therefore in 83 those areas have been removed. They could be filled with random noise or with a uniform grey, or could be encoded as invalid data in the encoding layer. From 82 it is also apparent that the eyebrows seen in 81 do not correspond to the actual brow ridge as seen in the thermal infrared image 82. They have therefore also been redacted in 83 as invalid data in the encoding layer.

Figure 9:
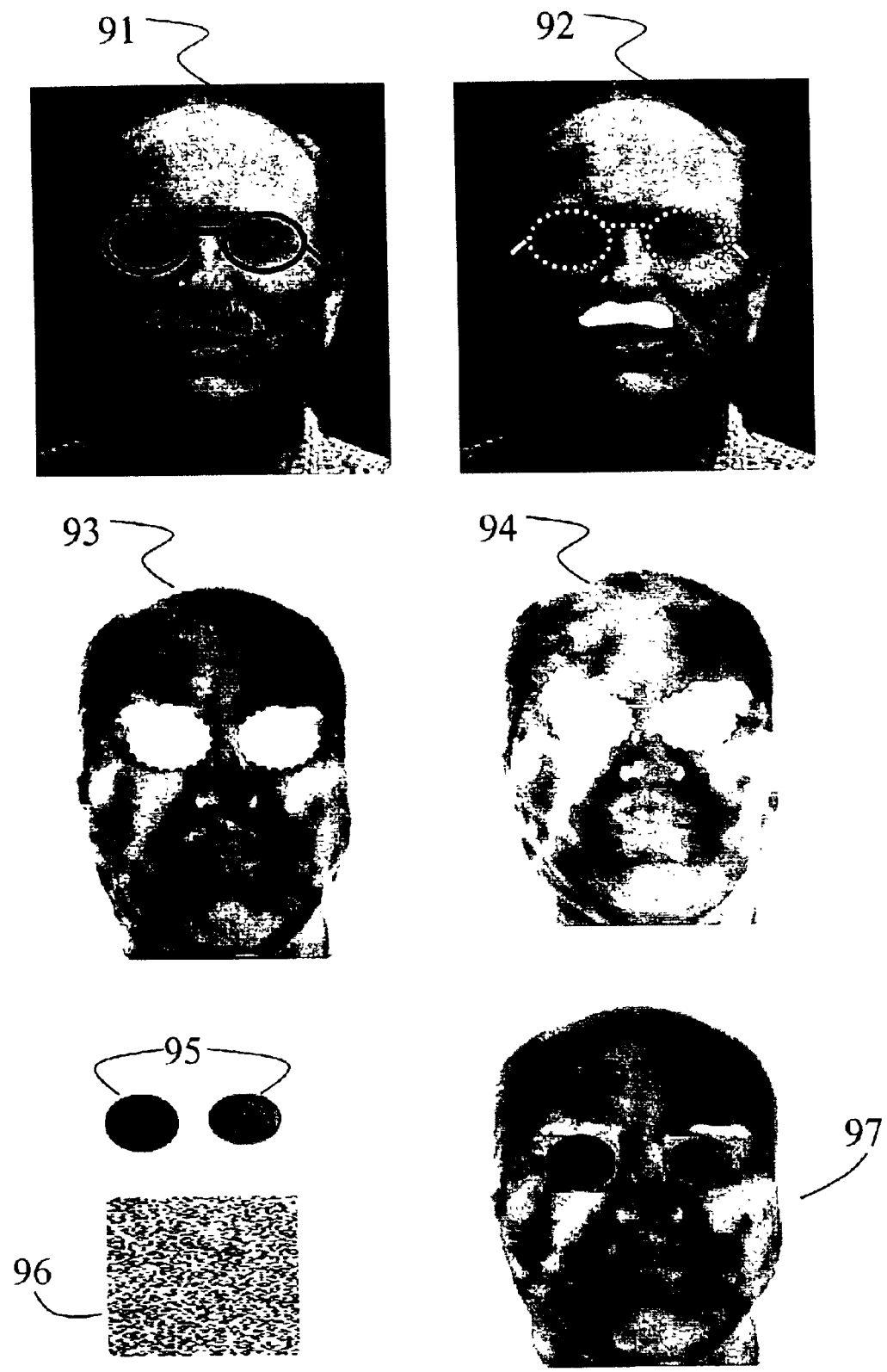
FIG. 9 illustrates the integration of analysis of visual and infrared images with respect to eyeglasses and a mustache.

FIG. 9 shows a visual image 91 in good lighting, where the subject is wearing eyeglasses and has a mustache. 93 and 94 are corresponding thermal IR images taken at two different temperature ranges in which the eyeglass lenses appear as uniformly cold ovals. 93 shows more cheek structure than 94, which shows more forehead structure than 93. The IR images show no evidence of a mustache, so the mustache is redacted on visual image 92. The eyeglasses are also redacted in visual image 92. A composite image is shown in 97 consisting of the combined thermal infrared structures seen in 93 and 94, and replacement of the eyeglass lens areas with corresponding cutouts 95 of the eyeglass lenses from the visual image 91. The eyeglass frame area could be used to cut out a random mask from 96 which would be superimposed in the corresponding position on 97. That is not done here, rather the eyeglass frame area is filled to blend with the surrounding pixels. The resulting 97 would be used as a grey scale image in infrared identification matching where the location of the eyes could be used for scaling, de-skewing, centering, and aligning the image to a standard or to another image.

Figure 10:
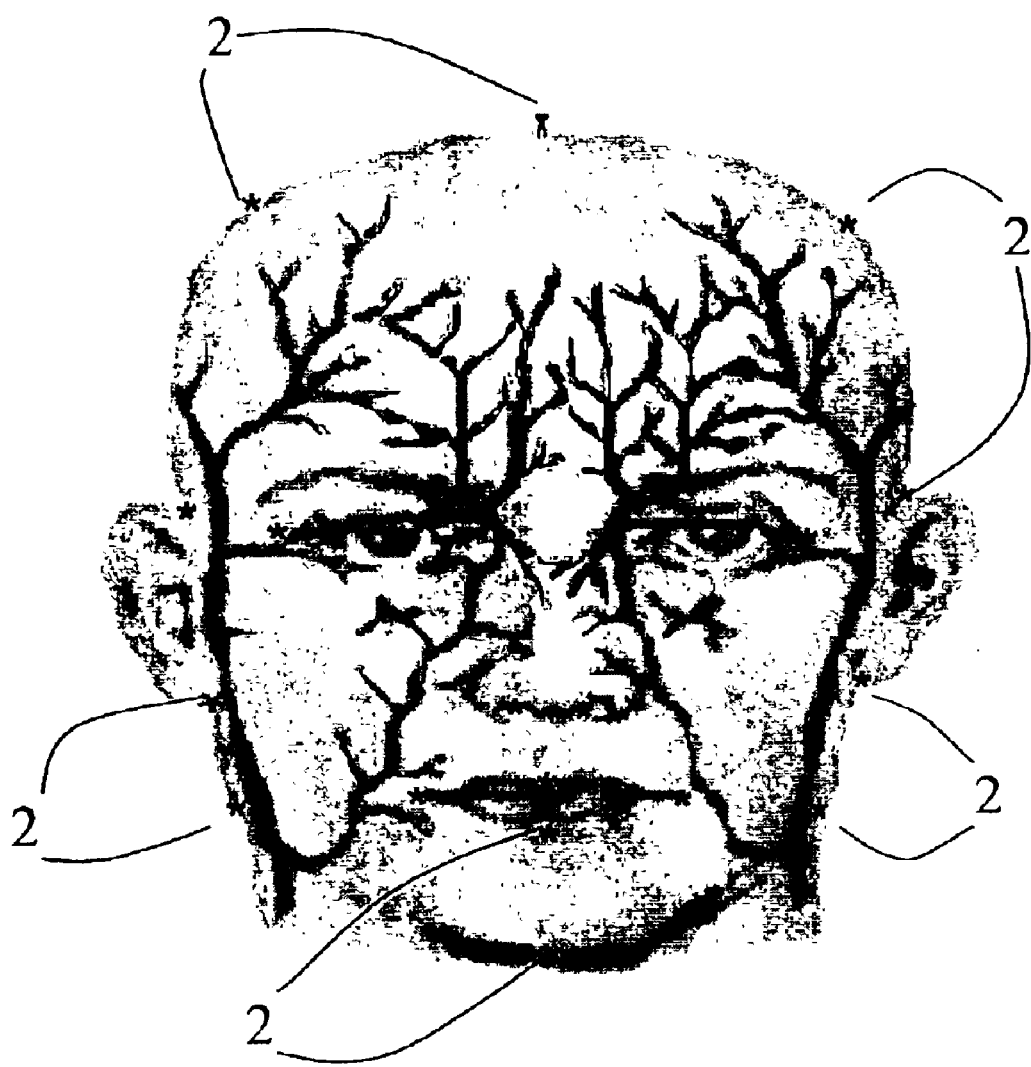
FIG. 10 represents a partial encoding of layers in a composite image resulting from analysis of corresponding visual and thermal infrared images. Multiple layers of the encoding are all registered to the same locations on the face.

FIG. 10 represents a partial encoding resulting from analysis of corresponding visual and thermal infrared images. Multiple layers of the encoding are all registered to the same locations (e.g. items 2) on the face. One layer represents the location of vascular features which can be extracted from the thermal infrared image. Here those are shown as the branching structure. In certain images, only disjointed segments of this structure may be apparent. Edges of the head, location of the chin line, junctions between ears and head, and location of facial features will also be apparent in the thermal infrared image and will be represented in vascular encoding layer.

The visual encoding layer will show the locations of the head outline and facial features as shown by the (*) markings 2. Other features which are verified from the IR analysis are also encoded in this layer, including scars, moles, wrinkles, crows feet about the eyes, creases aside the nose, and brow ridge.

Not shown here, a separate layer is used for cosmetic information which can be changed in the visual and which is not seen in the thermal infrared. This includes the color of hair, eyes, skin, and makeup. Also the outline area of eyebrows, eyelids, mouth, and other made-up features including "beauty marks". Hair which is determined or suspected to be fake is encoded in this layer.

Also not shown, another separate layer is used for real hair: cranial hair, bangs, eyebrows, sideburns, mustaches, beards, eyelashes. Unlike fake hair, real hair requires growing time and that fact can be useful in comparing images when the timing of their collection is known.

Figure 11:
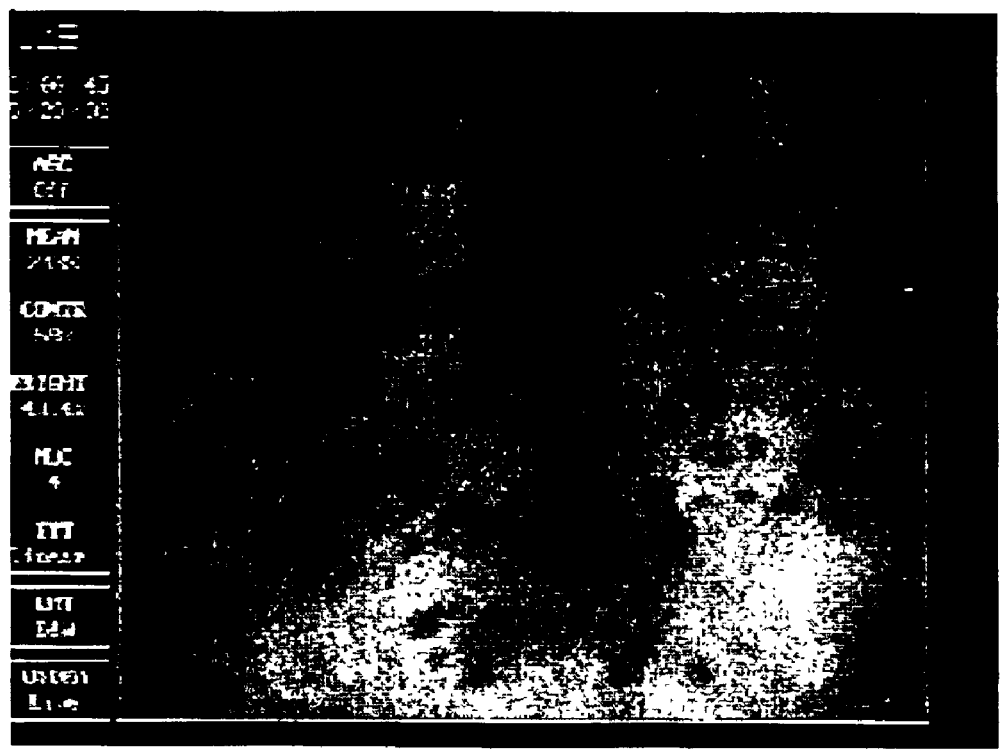
FIG. 11 is a thermal infrared image of a fingerprint.

FIG. 11 is a thermal infrared image of a fingerprint showing the (white) ridge lines and the (black) sweat pores. Although the entire finger is the same temperature, the moisture content of the sweat causes the pores to appear to be cold, which is show as black in this image. This person has very dry and thin skin and does not produce useable fingerprints from optical scanning systems. However, the ridge structure can be adequately seen from the thermal IR image. Furthermore, the use of sweat pores seen in the IR image offers a more direct set of features which requires less processing than does determining branch and end points from the ridge structures.

The system flow for the primary embodiment of a face identification system in accordance with the invention will now be described with reference to FIGS. 12A and 12B. The system collects dual-band images and matches them against existing databases of infrared and visual images. The System is Triggered 100 to begin operation by a sensor or by manual switch. Infrared 102 and visual 202 cameras are aimed at a face and produce sequences of one or more frame each at 110 and 210. Image quality analysis and improvement procedures are performed at 120 and 220 and corresponding frames are aligned and overlaid to produce a 2-layer image at 130.

The thermal infrared layer is analyzed at 140 to determine if there are any areas of sufficient size and apparent temperature which may represent a live face of sufficient quality to be classified or identified. If not, a report 142 is made and the system may stop or return to the next frame of image sequences 110 and 210. If a possible live face is detected, a disguise check is performed 144. If the face is assessed to be possibly disguised, a report 142 is generated. The system could continue to 146 but in this embodiment it merely reports disguised faces and does not attempt to identify them, leaving time to process other frames. If no disguise is detected 144, the thermal infrared image is checked for eyeglasses 146. If no eyeglasses are found, the system attempts to locate the eye centers 148 and draw the eye line 150. If eyeglasses are detected in the thermal infrared image at 146, the system attempts to locate the eye centers 240 in the visual image. If it cannot locate them, it reports 242 and proceeds to the next frame at 210. Various techniques can be used to estimate eye centers in the case where the eyes are closed in the frame, or the system can advance to successive frames in an attempt to find one in which the subjects' eyes are open. When the eye centers have been placed 240 they are superimposed on the thermal infrared layer at 244 and used to draw the eye line at 150. In the case of a profile view, or one in which only one eye is seen in the image at 148 or 240, the eye line may be drawn with reference to another facial feature, such as parallel to the nostrils or perpendicular to the vertical line of symmetry or perpendicular to a line drawn from the bridge of the nose to the indentation above the chin in profile views.

The system attempts to distinguish the mouth outline 152 and if it can it draws the mouth line 154. If it cannot, it considers the visual layer 250 and attempts to distinguish the mouthline. If it cannot, it reports 252. Various techniques can be used to estimate the mouth line at 254, which is then superimposed on the thermal infrared layer at 256.

The two-layered image is then scaled 156 to a standard, based upon the distance between the eye line and mouth line. This has been found to provide greater distribution of the population of human faces than scaling to the distance between the eyes, and applies as well to profile as full frontal images. The scaled image is further processed 158 by de-skewing, normalizing, and centering as well as other preparations needed for the comparison method to be used.

Figure 12A:
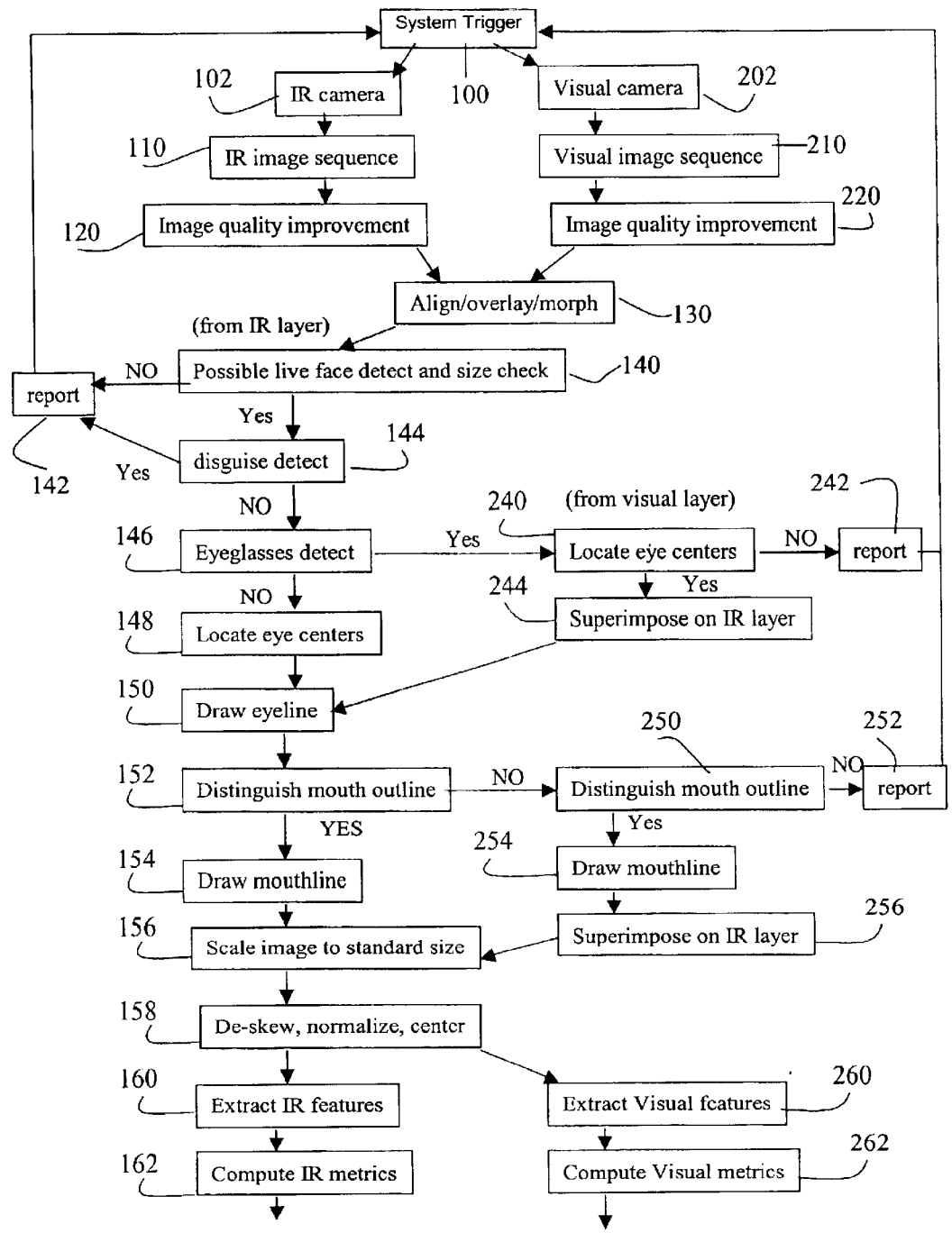
FIGS. 12A and 12B are a flow chart of the operation of the invention applied to face identification.
Figure 12B:
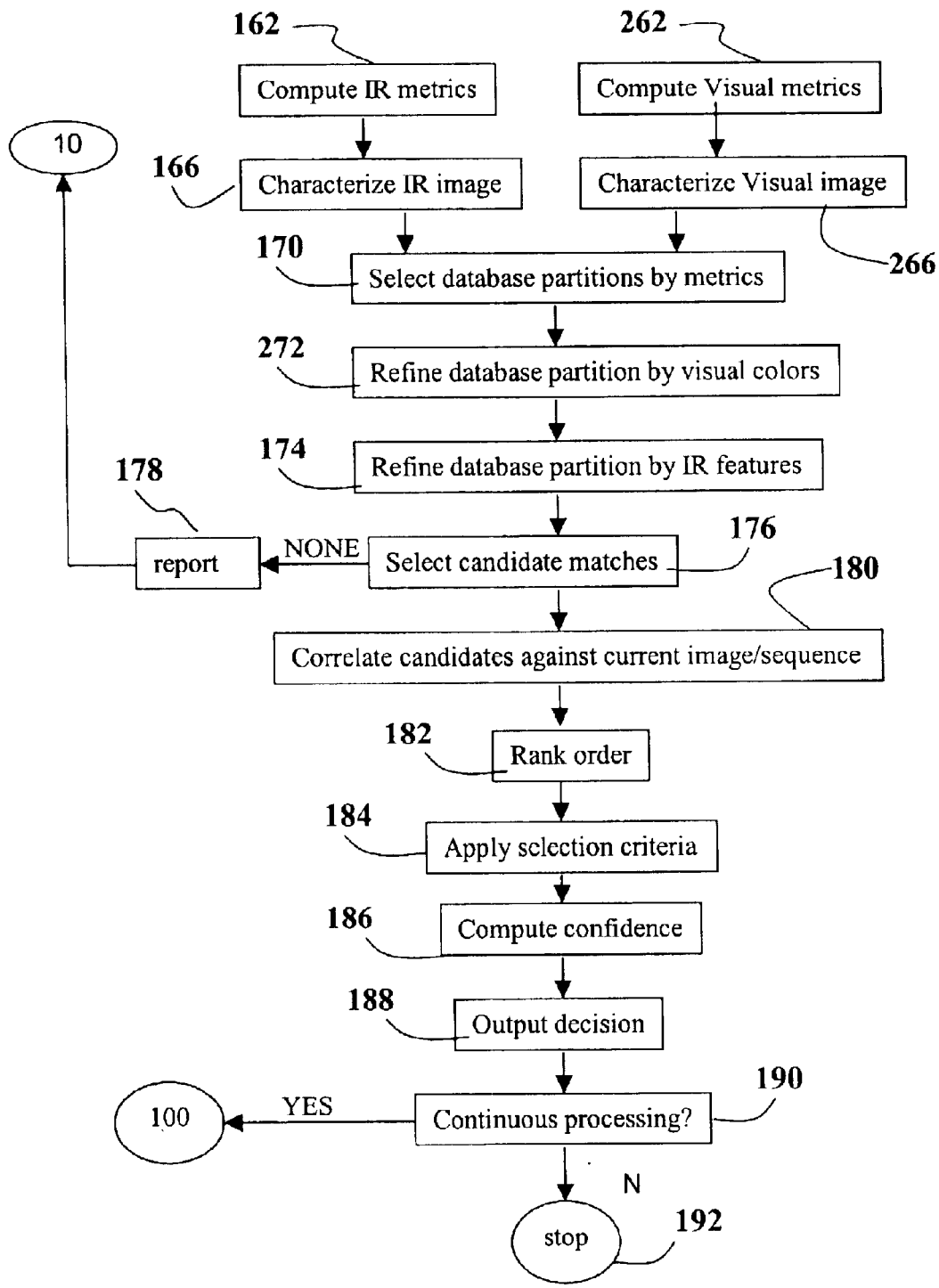

IR features 160 and visual features 260 of the resulting image are extracted and metrics are computed at 162 and 262, which are shown at the bottom of FIG. 12A and at the top of FIG. 12B (to provide continuity between the two figures for purposes of explanation). The metrics and other features are used to characterize the image layers at 166 and 266. Based on the metrics, partitions of the database are selected which may contain possible matches 170. That selection is refined by considering the colors 272 features of the visual images. The selection is further refined by considering details of IR features seen 174 in the current image and comparing them against both thermal infrared and visual images in their respective database segments. The comparison of a current thermal infrared image to a visual database image utilizes, in a preferred method, the pending patent U.S. patent application Ser. No. 09/422,273 of Prokoski for alignment and comparison of images from different imagers.

Candidate matches 176 are the result of the refinements. If no candidates are found, a report 178 is generated and the system may stop or return to image sequences 110 and 210. If candidates are found, the individual layers as well as the morphed combination layer 180 of the current image are correlated against individual IR and visual database candidates as well as against morphed IR/visual versions of the candidates. The consequent correlation values are rank ordered 182 and a selection criteria is applied 184. Since there may be multiple images of the same person in the database, the selection criteria may, for example, require that four of the top five candidate images be of the same person in order that he be declared the identity of the current subject. A confidence estimate 186 is computed for the expected accuracy of the selection. The algorithm is based on the statistical analysis of feature distribution in the databases. The output decision 188 includes the results of the selection and confidence factor. Depending on the application, the system makes a decision at 190 and either stops 192 or returns to 100 to considering additional image frames at 110 and 210.

Figure 13:
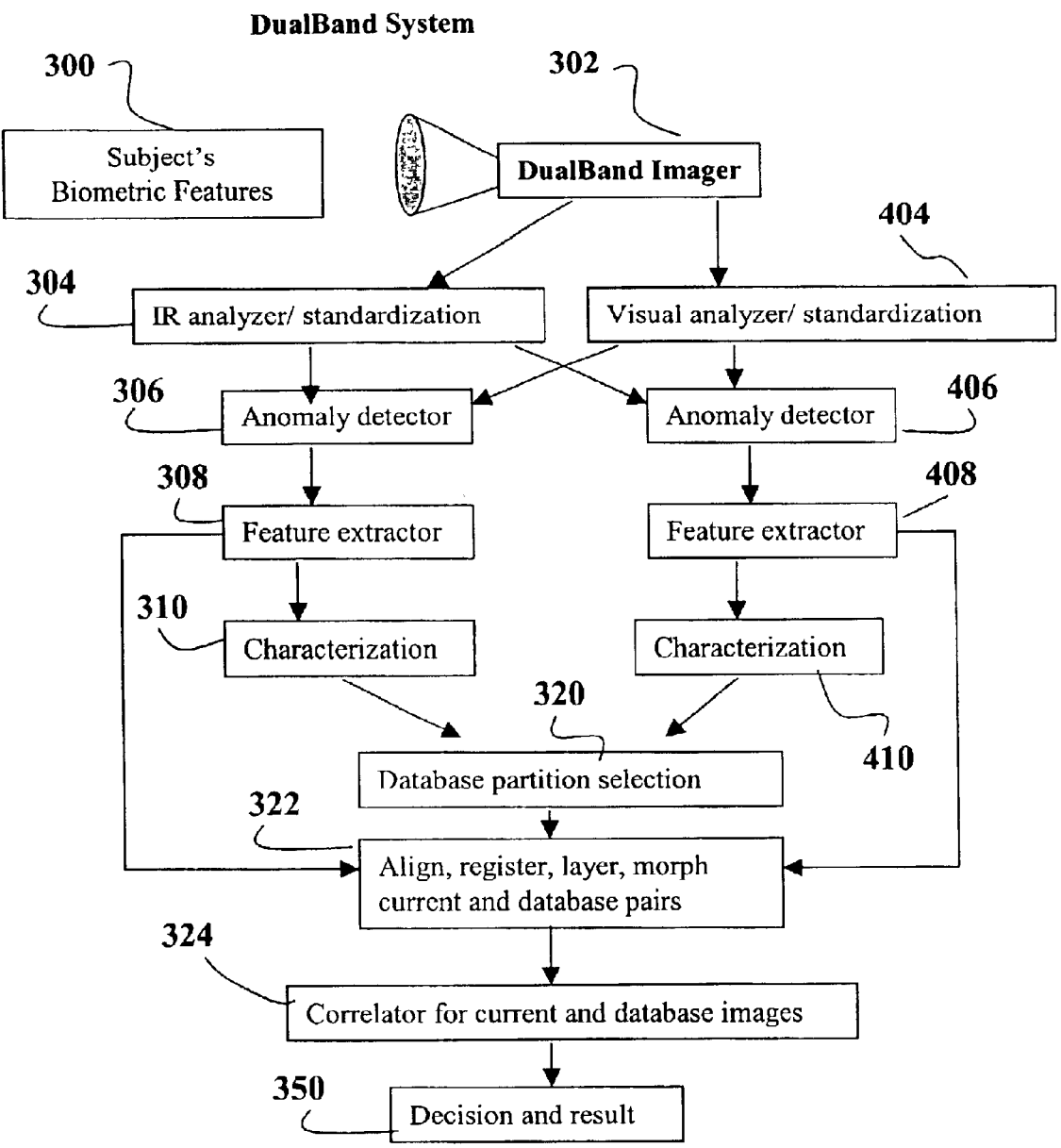
FIG. 13 is a schematic showing the interconnection of components in an apparatus for practicing the invention.

Now turning to FIG. 13, the components of a dual-band biometric system and their interaction in accordance with the invention will be discussed. A subject makes available his anatomical features 300 to a dual-band imager 302. This may mean presenting his face to a camera, his fingerprint to a scanner, or his eye to an iris-imaging system. The IR analyzer/standardization module 304 and visual analyzer/standardization module 404 processes corresponding sequences of images of some number of frames from the imager to standardize the imagery for further processing. This will include: scaling, centering, de-skewing, histogram normalization, and other such treatment. Anomaly detectors 306 and 406 then determine the location of anomalies according to software written for a particular purpose and particular biometric application. The IR anomaly detector uses the standardized visual image and the Visual anomaly detector uses the standardized thermal infrared image to assist in finding the anomalies. For certain anomalies, the image pair will be rejected; for others, the anomaly will be outlined in the appropriate mode image. For example, if the biometric technique is iris recognition, and the anomaly is that the eye is shut, that fact is best determined from the thermal infrared image. The image pair would be rejected and the next image pair in sequence would be considered until there were no remaining images. If the biometric technique is face recognition and the subject is wearing eyeglasses, that fact is most easily determined from the thermal infrared image. The eyeglass area would be designated by an outline on the thermal infrared image. Features in outlined areas would be considered unreliable for identification. Analysis would then need to consider edge effects of features which extend both in and out of anomalous areas.

If the dual band imager is designed to cycle through settings such as gain, contrast, focus, and spectral filter values, then anomalies can include areas in saturation or areas which are out of focus. A stack of images can be processed to excise areas with such anomalies and then morph the remaining portions. The best image of each area of the subject will be used to represent that area in the resulting composite morph.

The feature extractors 308 and 408 process the remaining and resulting images to extract those features which are to be used for that particular biometric. For example for fingerprint identification, minutiae locations and characteristics would be determined. Characterizations at 310 and 410 format the data to produce a selection of certain partitions of the Database 320 which might lead to identification of the subject. 320 contains thermal infrared images, visual images, and the results of morphing corresponding thermal infrared and visual images subject to the same anomaly detection and fill used on the subject images. Database partitions are selected 322 relative to the thermal infrared and visual images and corresponding characterizations.

Candidate matches are then tested by correlating 324 the morphed result of a pair of images of the subject against morphed corresponding images in the database. Decision results 350 are output as a report or action or display.

Figure 14:
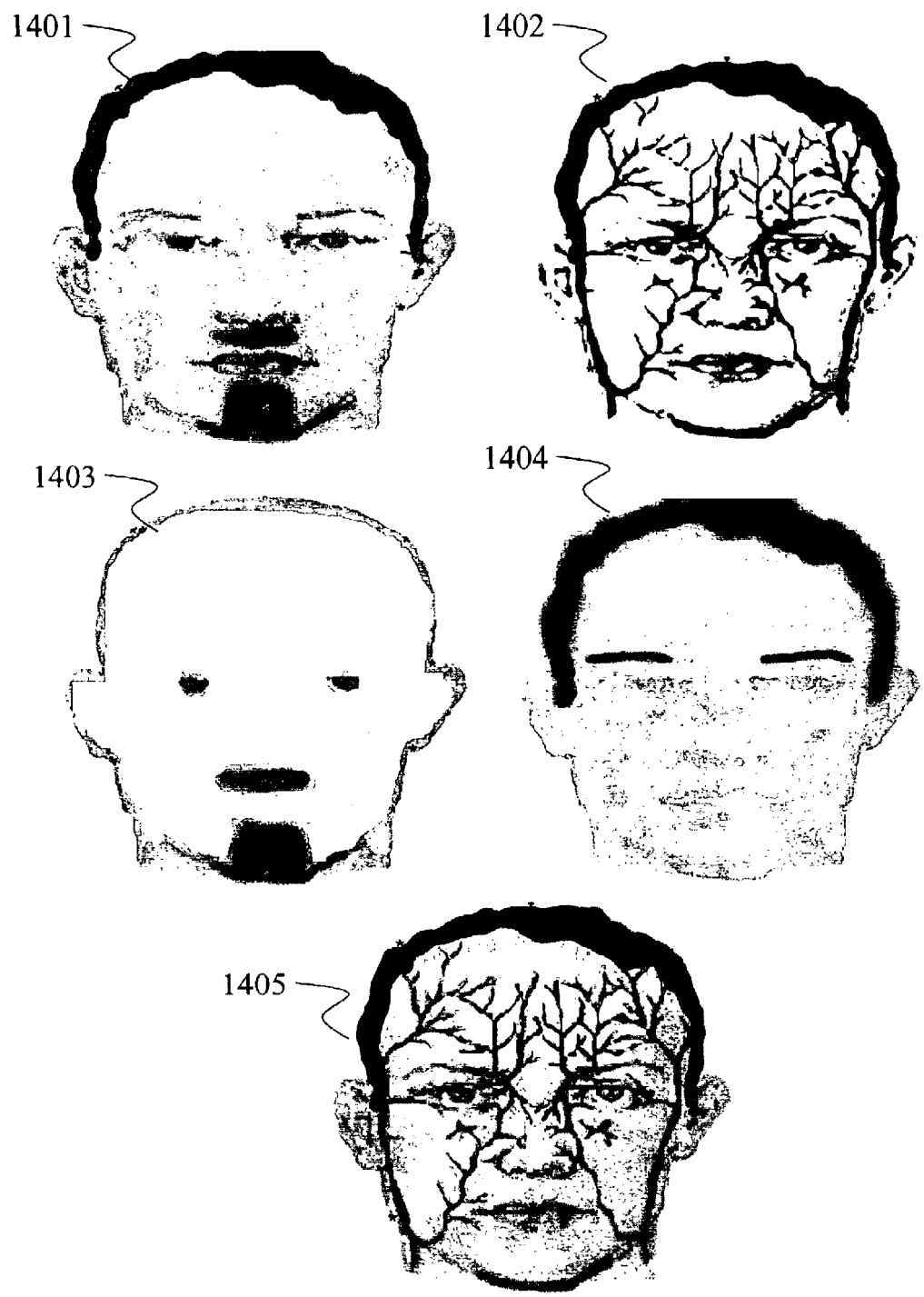
FIG. 14 illustrates a process for encoding the dual-band images and results of the image assessments and characterizations into a multi-layer composite image.

FIG. 14 illustrates a process for encoding the dual-band images and results of the image assessments and characterizations into a multi-layer composite image. 1401 is a (color) visual image of the subject taken under favorable lighting conditions. Key feature points are marked to show the location of inner and outer eye corners, the edge of the head, junctions between the ears and head, nostrils, edges of the nose, outer corners of the mouth, bow and maximum lower extent of the mouth. 1402 is a thermal infrared image of the same subject. Corresponding features are overlaid with those of 1401. 1402 forms another layer of the composite image. Based upon the system's comparison of 1401 and 1402, the system determines that the subject is wearing contact lenses, that the mustache and goatee are fake, and that other portions of the visual image are not disguised. 1403 is created as the layer representing areas which are disguised. Being derived from images 1401 and 1402, the 1403 layer is aligned with those layers. The other hair, namely eyebrows, eyelashes, and cranial hair, are used to create the hair layer 1404. It also, being derived from images 1401 and 1402, is aligned with the previous layers. A composite image 1405 is then created from the previous layers, depending upon various operations parameters, such as the time intervening between the collection of images 1401 and 1402, and the matching of an unknown image against those collected images. In this example, the intervening time is too short for the subject to have grown or shaved his hair. Therefore the composite includes layer 1404. However, it is sufficient time to have removed the fake mustache and goatee and contact lenses. Therefore, those items are removed from the composite image 1405. The time is also too short for the subject to have applied a skin or hair coloring agent or to have gotten a tan, therefore, the composite image is colored to match the hair and skin colors of 1401. Since the contact lenses may have been changed, the eyes in 1405 are colorless. The vascular structure of the face seen in 1402 will not have changed and so that layer is incorporated into the composite image.

The primary embodiment is the use of composite visual and thermal infrared imagery for face recognition. Steps in the production of the composite imagery are shown in FIG. 9. 91 is the visual image of the subject. 93 and 94 are thermal infrared images at different temperature ranges. From the IR images it is determined that eyeglasses are worn in the area indicted by dotted lines. Glasses are recognized as symmetrical objects of a certain general size and shape which appear cold relative to the facial area. It is also determined that the mustache seen in the visual image is not real but merely drawn onto the face. This analysis is performed by considering details of the infrared image in the mustache area. In this case, the hair follicles show only stubble. This conclusion is annotated onto visual image 92 by removing the mustache.

Identification is performed using the resultant composite image 97, which is formed by taking the best IR image of each area of the face (from the different temperature range images in 93 and 94), then cutting out the eyeglass area from the visual image a and pasting it on top. Then the frame of the glasses and the mustache area are replaced with matching templates cut from the random noise block 96. Various approximation routines regularly used by police sketch artists can be used to fill in those areas to produce a more "normal" looking image for distribution to human observers. In this example, an automated system will match based upon the thermal infrared image modified by the removal of glasses and replacement by visual eye areas. The resulting image is processed to extract feature locations, metrics, and other characterizations used for identification. Converting the eyeglass frames to random noise provides the best matching accuracy against databases which may contain images both with and without glasses, and where various glasses may be worn by the same person at various times. The image may be further augmented by painting the skin, hair and eyes in the resulting morphed image to match that in the visual image, or that information can be annotated and used in the database partitioning step. Since each of those color attributes can be changed by the subject at will, they are not reliable indicators for very high security applications, although powerful aids in partitioning large databases when disguise is not expected to be an issue. Color is also significant when fast response is required, such as to pursue an individual in a crowd after he has been identified.

The essence of this invention is that biometric identification often relies on the measurement and characterization of features obtainable from visual or thermal infrared images or from both. The two imaging modalities have generally different sources of image anomalies, and a composite image can be formed which excises anomalies in one band and replaces them with the corresponding section from the other band—and the composite can be used for identification. Since the thermal infrared image has more detailed feature information than the visual image, except for colors and area behind eyeglasses, the thermal infrared image is used to form the basis of the composite. When areas of the IR image are in saturation, or out of focus, or otherwise of poor quality, corresponding areas from other images taken close in time may be substituted. The resulting patchwork image would not be appropriate for certain applications of image analysis, such as medical diagnosis, but it does provide greater definition and content of features, patterns, and minutiae.

Current biometric systems which utilize visual images can benefit from using the face finding, disguise detection, and liveness testing capabilities of this system. Current biometric systems which utilize thermal infrared images can benefit from using the color capabilities and eyeglass penetration features of this system. No current biometric system uses both passive thermal infrared and passive visual images. The novelty of this invention lies in the systematic method for forming composite images based upon consideration of: human anatomy, imaging sensor limitations, accidental and intentional disguises, and the particular matching technique used.

A number of other embodiments of the invention will now briefly be mentioned:

1. Images taken with cameras at ATM machines include variations which affect the ability to identify persons from the images. Variations may include: variable lighting conditions ranging from darkness to glaring sunlight and shadows, dark skinned persons to very light skinned persons, cluttered backgrounds, height differences of three feet, eyeglasses and sunglasses, accidental and intentional disguises including head scarves and veils. In addition to persons using the ATM, it is advisable to image persons in the general area who may prey upon the ATM users. The application of this invention would use the IR band of the dual-band images to detect that a person is present within range of the ATM. In darkness the person's IR image is more readily apparent. In lighted conditions, the person can more easily be seen within a cluttered background. The IR image can be used to more readily determine if the person is wearing glasses, and whether his face is towards the machine. Therefore, the IR image can more accurately predict that a user is approaching, and can more quickly activate its interactive function. Once the ATM has been activated, both visual and IR images are taken. The IR image is used to detect if the face is hidden or disguised, and is matched against a database of known IR images if one exists. If the IR image indicates that the person is wearing a disguise, the ATM may refuse to operate. Otherwise, the visual image is matched against a database of visual images corresponding to known clients, and access is granted to accounts associated with the person identified. If the IR imager detects the presence of another person in the area, it can warn the current user and can activate remote surveillance of the site until the current user and the other person are both out of the area.

2. Biometric identification for access to high security areas can achieve greater accuracy with the use of dual-band imaging. IR images are used to detect disguises, distinguish identical twins, determine presence of onlookers, assure that the subject is alive and detect drug or alcohol use. Visual images are more readily identified by guards and response forces, and can be used to detect attempts to defeat IR ID by use of face painting with different emissivity paints.

3. Airport security screening is a special case of biometric ID where the IR image provides key security elements, but the visual images are transmitted to security patrols for followup tracking, searching at customs, matching to known Watch lists, etc.

4. Information assurance or computer network security has particular illumination problems to solve since lighting from computer monitor screens may vary, as does ambient lighting, and skin tone. Cameras mounted on the monitor can use IR to detect: presence of a user, onlookers, ID of persons within the field of view, also drug and alcohol, respiration rate, blood pressure, and other factors for determining cognitive readiness and physical condition. The system can use both visual and IR to determine identity, and IR to determine possible disguises. If glasses are worn, that portion of the visual image can be used to determine eye location, blink rate, eyelid closure rates, and pupil size to assist in determining the level of attention of the subject.

5. Continuity of identification is provided by the IR band when tracking a subject who moves through areas having various lighting levels. The IR camera image quality need not be sufficient for identification of the subject in order to effectively provide maintaining tracking of the subject. Similarly, a visual image may be used for initial identification of a pilot entering a cockpit or an air traffic controller initiating his shift under well lighted conditions. However, the IR image band is then used to maintain continuity of the identification as the lights are turned off. The IR band is also used to monitor condition changes in the person originally identified by his visual image.

6. When matching persons against Watch Lists of visual images, the IR band images can be used to eliminate persons who cannot match the list because their anatomical structure conflicts with the feature metrics of Watch List entries. When a person is known to be a twin, or to use disguises, or to have a very common appearance, the IR image band can provide the needed accuracy of identification over that of visual ID, and can speed the processing of large databases.

7. In fingerprint matching of persons who do not give acceptable normal visual prints, the IR image band can provide necessary level of detail to permit positive ID. Certain classes of people, such as the elderly, Asians, Artisans, and certain other ethnic groups such as Ethiopians, do not provide fingerprints which can be effectively identified using the same systems based on rolled or scanned prints which are most commonly used in Western countries. However, sweat pores and ridge lines which are not seen in visually scanned prints or rolled ink prints may be well defined in IR images. The visual band provides the skin color and any other distinguishing characteristics such as ink or tobacco stains.

While the invention has been described in terms of preferred embodiments, those skilled in the art will recognize that the invention can be practiced with modification within the spirit and scope of the appended claims.

Having thus described my invention, what I claim as new and desire to secure by Letters Patent is as follows:

1. A method for biometric recognition, comprising the steps of:
   combining a first band imager and a second band imager into a dual-band system;
   generating from said dual-band system corresponding images of a specified body area of a subject, said corresponding images comprising a first band image and a second band image;
   responsive to anatomical characteristics of said specified body area, determining for said first band image which portions of said image are degraded;
   encoding said degraded portions in an encoded image;
   creating a composite image comprising separate layers for at least said first band image, said second band image, and said encoded image; and
   using said composite image to identify said subject.

2. The method of claim 1, wherein said first band imager is a visual imager and said second band imager is a thermal infrared camera, and wherein said specified body area is a human face.

3. The method of claim 2, wherein said determining step compares said first band image with said second band image to identify disguises on said first band image and to encode said disguises in said encoded layer.

4. The method of claim 3, wherein said determining step ascertains portions of the visual image which are degraded due to illumination conditions.

5. The method of claim 2, wherein said visual image is used to determine the location and features of the eyes of said subject.

6. The method of claim 1, wherein said first band imager is a thermal infrared camera and said second band imager is a visual imager, and wherein said specified body area is a human face.

7. The method of claim 6, wherein said determining step ascertains portions of the thermal infrared image which are degraded due to image saturation.

8. The method of claim 6, wherein said thermal infrared image is used to determine whether facial hair is present.

9. The method of claim 1, wherein the specified body area is a fingerprint and wherein said composite image is correlated with a database of fingerprint images to identify said subject.

10. The method of claim 9, wherein said correlation is performed with a Hidden Markov Method.

11. A system for biometric recognition, comprising:
    means for combining a first band imager and a second band imager into a dual-band system;
    means for generating from said dual-band system corresponding images of a specified body area of a subject, said corresponding images comprising a first band image and a second band image;
    means, responsive to anatomical characteristics of said specified body area, for determining for said first band image which portions of said image are degraded;
    means for encoding said degraded portions in an encoded image;
    means for creating a composite image comprising separate layers for at least said first band image, said second band image, and said encoded image; and
    means for using said composite image to identify said subject.

12. The system of claim 11, wherein said first band imager is a visual imager and said second band imager is a thermal infrared camera, and wherein said specified body area is a human face.

13. The system of claim 12, wherein said determining means compares said first band image with said second band image to identify disguises on said first band image and said encoding means encodes said disguises in said encoded layer.

14. The system of claim 13, wherein said determining means ascertains portions of the visual image which are degraded due to illumination conditions.

15. The system of claim 12, wherein said visual image is used to determine the location and features of the eyes of said subject.

16. The system of claim 11, wherein said first band imager is a thermal infrared camera and said second band imager is a visual imager, and wherein said specified body area is a human face.

17. The system of claim 16, wherein said determining means ascertains portions of the thermal infrared image which are degraded due to image saturation.

18. The system of claim 16, wherein said thermal infrared image is used to determine whether facial hair is present.

19. The system of claim 11, wherein the specified body area is a fingerprint and wherein said composite image is correlated with a database of fingerprint images to identify said subject.

20. The system of claim 16, wherein pixels in the eye area of said composite image are taken from the visual image and pixels in the remaining areas of the composite image are taken from the thermal infrared image.

* * * * *